US012589630B2

(12) United States Patent
Inoue

(10) Patent No.: US 12,589,630 B2
(45) Date of Patent: Mar. 31, 2026

(54) VEHICLE AIR-CONDITIONING APPARATUS

(71) Applicant: Mitsubishi Electric Corporation, Tokyo (JP)

(72) Inventor: Takeshi Inoue, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 202 days.

(21) Appl. No.: 18/698,389

(22) PCT Filed: Dec. 7, 2021

(86) PCT No.: PCT/JP2021/044943
§ 371 (c)(1),
(2) Date: Apr. 4, 2024

(87) PCT Pub. No.: WO2023/105631
PCT Pub. Date: Jun. 15, 2023

(65) Prior Publication Data
US 2024/0399829 A1      Dec. 5, 2024

(51) Int. Cl.
B60H 1/00           (2006.01)
(52) U.S. Cl.
CPC ..... B60H 1/00921 (2013.01); B60H 1/00521 (2013.01); B60H 2001/00714 (2013.01)
(58) Field of Classification Search
CPC ........... B60H 1/00921; B60H 1/00521; B60H 2001/00714
USPC ....................................... 165/202
See application file for complete search history.

(56) References Cited

U.S. PATENT DOCUMENTS

2003/0056529 A1     3/2003  Kakehashi et al.

FOREIGN PATENT DOCUMENTS

BR      202016018617 U2 *  2/2018  .............. F24F 1/027
EP         0768198 A2     4/1997
JP        H0688638 A      3/1994
JP       2009298174 A    12/2009
(Continued)

OTHER PUBLICATIONS

Extended European Search Report dated Jan. 24, 2025, issued in the corresponding European Patent Application No. 21967133.6, 9 pages.

(Continued)

*Primary Examiner* — Davis D Hwu
(74) *Attorney, Agent, or Firm* — Buchanan Ingersoll & Rooney PC

(57)           ABSTRACT

A vehicle air-conditioning apparatus includes emergency dampers switchable between opening states for opening emergency vents and closing states for closing emergency vents. A control device switches the emergency dampers from the closing states to the opening states while keeping an indoor fan operating, when determining that refrigerant is leaked from a refrigerant circuit on the basis of results of detection by refrigerant leakage detectors. An indoor unit chamber includes supply air guiding sub-chambers for guiding the internal air delivered by the indoor fan to supply openings. The emergency vents are included in the supply air guiding sub-chambers. The indoor fan forms flows of the internal air with the air pressures in the supply air guiding sub-chambers being higher than the atmospheric pressure.

20 Claims, 8 Drawing Sheets

(56) References Cited

FOREIGN PATENT DOCUMENTS

JP          2017149317  A       8/2017

OTHER PUBLICATIONS

International Search Report (PCT/ISA/210) with translation and Written Opinion (PCT/ISA/237) mailed on Feb. 8, 2022, by the Japanese Patent Office as the International Searching Authority for International Application No. PCT/JP2021/044943. (8 pages).

* cited by examiner

FIG. 1
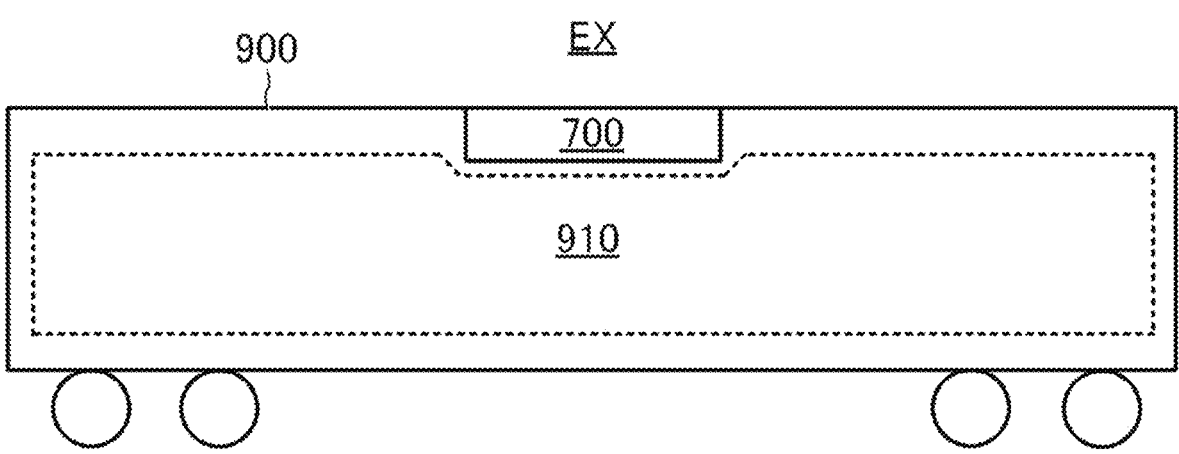
900
EX
700
910
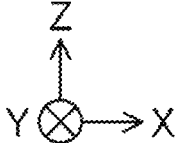
Z
Y ⊗ → X

FIG. 4

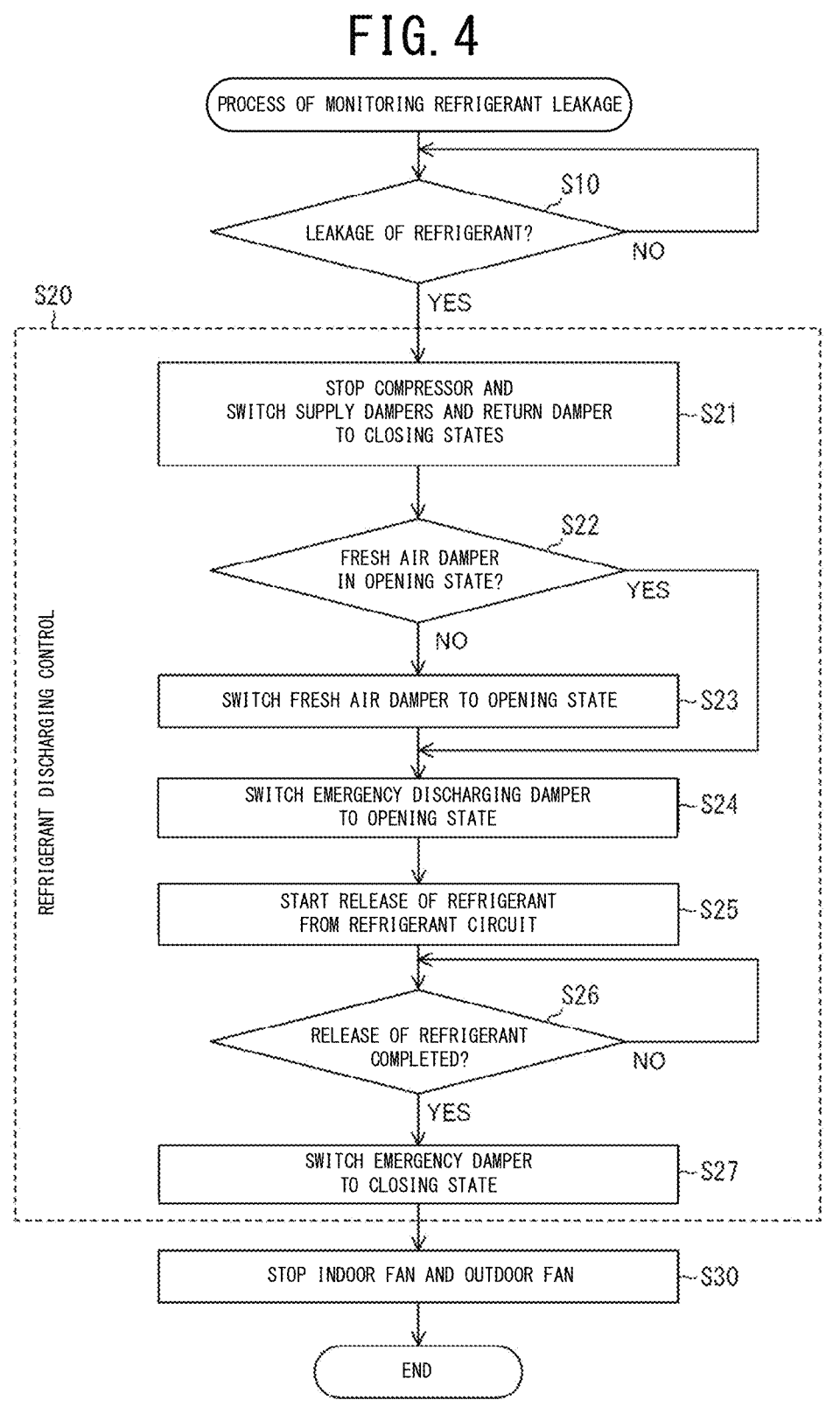

```
( PROCESS OF MONITORING REFRIGERANT LEAKAGE )
                      │
                      ▼
                  ◇ S10
            LEAKAGE OF REFRIGERANT?  ──NO──┐
                      │                     │
                     YES                    │
                      ▼                     │
```

S20

REFRIGERANT DISCHARGING CONTROL

```
┌─────────────────────────────────────┐
│ STOP COMPRESSOR AND                  │ ~S21
│ SWITCH SUPPLY DAMPERS AND RETURN     │
│ DAMPER TO CLOSING STATES             │
└─────────────────────────────────────┘
                  │
                  ▼
              ◇ S22
        FRESH AIR DAMPER
        IN OPENING STATE?  ──YES──┐
                  │                │
                 NO                │
                  ▼                │
┌─────────────────────────────────┐
│ SWITCH FRESH AIR DAMPER TO       │ ~S23
│ OPENING STATE                    │
└─────────────────────────────────┘
                  │
                  ▼
┌─────────────────────────────────┐
│ SWITCH EMERGENCY DISCHARGING     │ ~S24
│ DAMPER TO OPENING STATE          │
└─────────────────────────────────┘
                  │
                  ▼
┌─────────────────────────────────┐
│ START RELEASE OF REFRIGERANT     │ ~S25
│ FROM REFRIGERANT CIRCUIT         │
└─────────────────────────────────┘
                  │
                  ▼
              ◇ S26
        RELEASE OF REFRIGERANT
        COMPLETED?  ──NO──┐
                  │        │
                 YES       │
                  ▼        │
┌─────────────────────────────────┐
│ SWITCH EMERGENCY DAMPER          │ ~S27
│ TO CLOSING STATE                 │
└─────────────────────────────────┘
                  │
                  ▼
┌─────────────────────────────────┐
│ STOP INDOOR FAN AND OUTDOOR FAN  │ ~S30
└─────────────────────────────────┘
                  │
                  ▼
              ( END )
```

VEHICLE AIR-CONDITIONING APPARATUS

TECHNICAL FIELD

The present disclosure relates to a vehicle air-conditioning apparatus.

BACKGROUND ART

Vehicle air-conditioning apparatuses to be installed in vehicles each condition the air in the interior compartment by means of a refrigerant circuit including circulating refrigerant. The "interior compartment" indicates a space defined for accommodating passengers in the vehicle. The refrigerant circuit constitutes a refrigeration cycle, and thus achieves heat and coolness necessary for the air conditioning in the interior compartment.

Patent Literature 1 discloses a vehicle air-conditioning apparatus having a function of detecting leakage of refrigerant from a refrigerant circuit. This vehicle air-conditioning apparatus, when detecting leakage of refrigerant, discharges the leaked refrigerant to the exterior of a vehicle, using a negative pressure generated by the running of the vehicle.

CITATION LIST

Patent Literature

Patent Literature 1: Unexamined Japanese Patent Application Publication No. 2017-149317

SUMMARY OF INVENTION

Technical Problem

The apparatus disclosed in Patent Literature 1 may fail to rapidly discharge the leaked refrigerant to the exterior, especially during the running of the vehicle at a low speed or the stopping of the vehicle because of insufficient formation of the above-mentioned negative pressure.

An objective of the present disclosure is to provide a vehicle air-conditioning apparatus that can rapidly discharge the leaked refrigerant to the exterior.

Solution to Problem

A vehicle air-conditioning apparatus according to the present disclosure includes: a housing installable in a vehicle, the housing including an indoor unit chamber having a return opening and a supply opening each continuous to an interior compartment of the vehicle, and an emergency vent continuous to an exterior of the vehicle; an emergency damper provided to the emergency vent and configured to be switchable between an opening state for opening the emergency vent and a closing state for closing the emergency vent; an indoor fan disposed in the indoor unit chamber and configured to draw internal air, which is air in the interior compartment, through the return opening, and deliver the drawn internal air toward the supply opening, and thus form a flow of the internal air from the return opening toward the supply opening in the indoor unit chamber, while the emergency damper is in the closing state; a refrigerant circuit disposed at a position, in the indoor unit chamber, in a path of the flow of the internal air, and including an indoor heat exchanger to perform heat exchange between refrigerant and the internal air, and a group of cooperative devices to constitute a refrigeration cycle using the refrigerant with the indoor heat exchanger; a refrigerant leakage detector to detect leakage of the refrigerant from the refrigerant circuit; and a control device to execute a refrigerant discharging control involving switching the emergency damper from the closing state to the opening state while keeping the indoor fan operating, when the control device determines, based on a result of detection by the refrigerant leakage detector, that the refrigerant is leaked from the refrigerant circuit. The indoor unit chamber includes a supply air guiding sub-chamber to guide the internal air delivered by the indoor fan to the supply opening. The indoor heat exchanger is disposed in the supply air guiding sub-chamber. The emergency vent is included in the supply air guiding sub-chamber. The indoor fan forms the flow of the internal air with an air pressure in the supply air guiding sub-chamber being higher than an atmospheric pressure that is an air pressure in the exterior of the vehicle.

Advantageous Effects of Invention

Because of the above-described structure in which the indoor heat exchanger is disposed in the supply air guiding sub-chamber, the refrigerant if leaked from the segment of the refrigerant circuit including the indoor heat exchanger may exist in the supply air guiding sub-chamber. The air pressure in the supply air guiding sub-chamber is maintained to be higher than the atmospheric pressure at the switching of the emergency damper to the opening state. This emergency damper switched in the opening state can achieve rapid discharge of the leaked refrigerant in the supply air guiding sub-chamber to the exterior of the vehicle through the emergency vent.

BRIEF DESCRIPTION OF DRAWINGS

FIG. 1 is a side view illustrating a manner of installation of a vehicle air-conditioning apparatus according to Embodiment 1;

FIG. 4 is a flowchart illustrating a process of monitoring refrigerant leakage according to Embodiment 1;

DESCRIPTION OF EMBODIMENTS

Figure 2:
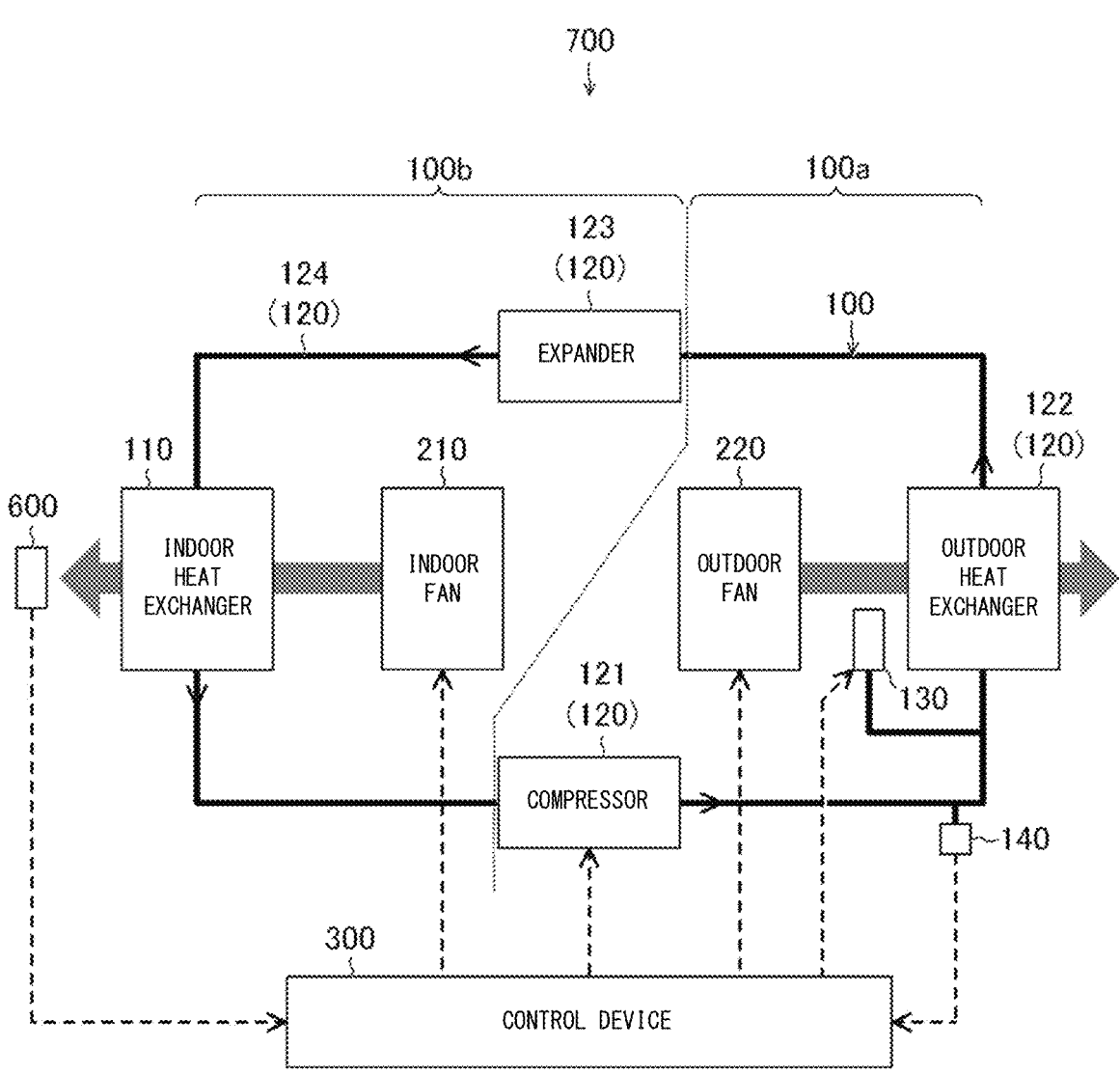
FIG. 2 is a conceptual diagram illustrating a refrigerant circuit according to Embodiment 1.

A vehicle air-conditioning apparatus according to Embodiments 1 to 3 is described below with reference to the accompanying drawings. In the drawings, the components identical or corresponding to each other are provided with the same reference symbol.

Embodiment 1

As illustrated in FIG. 1, a vehicle air-conditioning apparatus 700 according to Embodiment 1 is installed on the roof of a railway vehicle 900, which is a vehicle.

The railway vehicle 900 includes an interior compartment 910 defined therein. Specifically, the interior compartment 910 is a passenger compartment for accommodating passengers. The vehicle air-conditioning apparatus 700 conditions the air in the interior compartment 910. The vehicle air-conditioning apparatus 700 has a structure described below.

As illustrated in FIG. 2, the vehicle air-conditioning apparatus 700 includes a refrigerant circuit 100 that constitutes a refrigeration cycle using refrigerant. The refrigerant circuit 100 has the refrigerant enclosed therein. The refrigerant circulates inside the refrigerant circuit 100 and thus constitutes a refrigeration cycle.

The refrigerant in this embodiment contains at least 95 mass % of hydrocarbon, specifically, propane. One of the purposes of this composition is to suppress global warming. Such refrigerant is combustible. The refrigerant circuit 100 has a structure specifically described below.

The refrigerant circuit 100 includes at least one indoor heat exchanger 110 to perform heat exchange between the refrigerant and the air (hereinafter referred to as "internal air") in the interior compartment 910 illustrated in FIG. 1, and a group of cooperative devices 120 to constitute the refrigeration cycle with the indoor heat exchanger 110. The indoor heat exchanger 110 in this embodiment serves as an evaporator to evaporate the refrigerant.

The group of cooperative devices 120 includes a compressor 121 to compress the refrigerant evaporated by the indoor heat exchanger 110, at least one outdoor heat exchanger 122 serving as a condenser to condense the compressed refrigerant, and at least one expander 123 to expand the condensed refrigerant. The refrigerant expanded by the expander 123 returns to the indoor heat exchanger 110. The outdoor heat exchanger 122 performs heat exchange between the refrigerant and the air (hereinafter referred to as "external air") in the exterior EX outside the railway vehicle 900 and the vehicle air-conditioning apparatus 700 illustrated in FIG. 1 (hereinafter referred to simply as "exterior EX").

The group of cooperative devices 120 also includes a refrigerant pipe 124 to guide the refrigerant. The indoor heat exchanger 110, the compressor 121, the outdoor heat exchanger 122, and the expander 123 described above are connected to each other with the refrigerant pipe 124.

The vehicle air-conditioning apparatus 700 further includes an indoor fan 210 to facilitate the heat exchange at the indoor heat exchanger 110, and an outdoor fan 220 to facilitate the heat exchange at the outdoor heat exchanger 122. The indoor fan 210 forms flows of the internal air passing through the indoor heat exchanger 110. The outdoor fan 220 forms flows of the external air passing through the outdoor heat exchanger 122.

The vehicle air-conditioning apparatus 700 also includes a control device 300 to control the compressor 121, the indoor fan 210, and the outdoor fan 220. The control device 300 activates the compressor 121, the indoor fan 210, and the outdoor fan 220, and thus starts the air conditioning in the interior compartment 910 illustrated in FIG. 1.

During the air conditioning in the interior compartment 910, the refrigerant can be leaked from the refrigerant circuit 100 due to an accidental failure. The refrigerant leaked from the refrigerant circuit 100 may enter the interior compartment 910, and thus lower the oxygen concentration in the interior compartment 910.

Such refrigerant leaked from the refrigerant circuit 100 is desired to be rapidly discharged to the exterior EX. The leaked refrigerant needs to be rapidly discharged to the exterior EX also in terms of preventing a fire, because the refrigerant in the embodiment is combustible as described above.

The vehicle air-conditioning apparatus 700 thus includes a feature for detecting leakage of the refrigerant, and a feature for rapidly discharging the leaked refrigerant to the exterior EX. These features are described below.

The vehicle air-conditioning apparatus 700 further includes refrigerant leakage detectors 600 to detect leakage of the refrigerant from the refrigerant circuit 100. The control device 300 determines whether the refrigerant is leaked on the basis of results of detection by the refrigerant leakage detectors 600.

The refrigerant circuit 100 also includes a refrigerant release valve 130 for allowing the refrigerant to be released from the refrigerant circuit 100. The refrigerant release valve 130 is switchable between an open state for allowing the refrigerant to be released from the refrigerant circuit 100 and a closed state for preventing the refrigerant from being released. While the refrigerant release valve 130 is in the closed state, the refrigerant circuit 100 constitutes the refrigeration cycle.

The control device 300, when determining that the refrigerant is leaked from the refrigerant circuit 100, switches refrigerant release valve 130 from the closed state to the open state, and thus achieves active discharge of the refrigerant to the exterior EX. This active discharge can reduce the probability of entrance of the leaked refrigerant into the interior compartment 910.

The refrigerant circuit 100 further includes a refrigerant pressure detector 140 to detect a pressure of the refrigerant enclosed in the refrigerant circuit 100. On the basis of a result of detection by the refrigerant pressure detector 140, the control device 300 determines whether the active release of the refrigerant from the refrigerant circuit 100 is completed.

The part of the refrigerant circuit 100, including the compressor 121, the outdoor heat exchanger 122, the segment of the refrigerant pipe 124 that connects the compressor 121 to the outdoor heat exchanger 122, and the segment of the refrigerant pipe 124 that connects the outdoor heat exchanger 122 to the expander 123, is called a high pressure part 100a. The high pressure part 100a has a pressure of the refrigerant higher than the pressure of the refrigerant in a low pressure part 100b, which is the rest part of the refrigerant circuit 100, during the operation of the compressor 121.

The refrigerant release valve 130 and the refrigerant pressure detector 140 described above are provided to the high pressure part 100a of the refrigerant circuit 100. Specifically, the refrigerant release valve 130 and the refrigerant pressure detector 140 are provided to the segment of the refrigerant pipe 124 that connects the compressor 121 to the outdoor heat exchanger 122.

The following describes a detailed structure of the vehicle air-conditioning apparatus 700 in specific.

The description defines the XYZ orthogonal coordinate system illustrated in FIG. 1 in order to facilitate an understanding. This XYZ orthogonal coordinate system has the X axis parallel to the lengthwise direction of the railway vehicle 900 (hereinafter referred to as "lengthwise direction"), the Y axis parallel to the widthwise direction of the railway vehicle 900 (hereinafter referred to as "widthwise direction"), and the Z axis parallel to the vertical height direction. The XYZ orthogonal coordinate system is also provided to the drawings referenced by the following description.

Figure 3A:
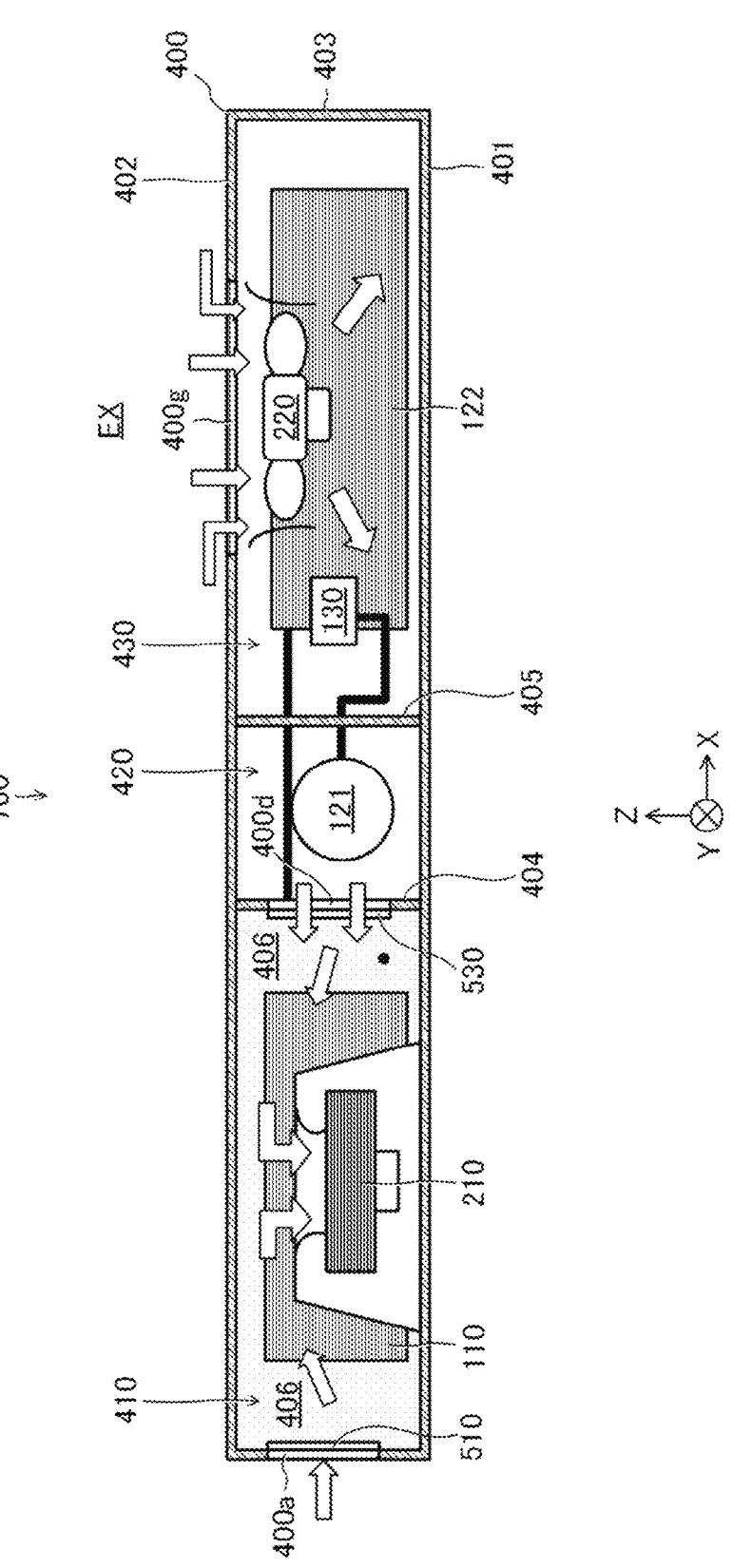
FIG. 3A is a sectional view of the vehicle air-conditioning apparatus according to Embodiment 1 taken along a plane parallel to the lengthwise direction.

As illustrated in FIG. 3A, the vehicle air-conditioning apparatus 700 includes a housing 400. The housing 400 accommodates the devices illustrated in FIG. 2.

The housing 400 has a box shape as a whole. Specifically, the housing 400 includes a bottom plate 401 that faces the roof of the railway vehicle 900 illustrated in FIG. 1, a top plate 402 opposed to the bottom plate 401 in the height direction, and lateral plates 403 that close the gaps between the top plate 402 and the bottom plate 401.

The housing 400 also includes partition plates 404 and 405 therein that divide the space defined by the bottom plate 401, the top plate 402, and the lateral plates 403 into three chambers. One partition plate 404 is opposed to the other partition plate 405 in the lengthwise direction.

The housing 400 thus includes an indoor unit chamber 410, a compressor chamber 420, and an outdoor unit chamber 430 arranged in the lengthwise direction. The compressor chamber 420 resides between the indoor unit chamber 410 and the outdoor unit chamber 430. The indoor unit chamber 410 and the compressor chamber 420 share one partition plate 404, whereas the compressor chamber 420 and the outdoor unit chamber 430 share the other partition plate 405.

The individual structures of the indoor unit chamber 410, the compressor chamber 420, and the outdoor unit chamber 430 are described below with reference to FIG. 3B.

The description first focuses on the structure of the indoor unit chamber 410. The indoor unit chamber 410 accommodates the indoor heat exchanger 110 and the indoor fan 210 described above. The indoor heat exchanger 110 includes a first indoor heat exchanger 110a and a second indoor heat exchanger 110b connected in parallel relative to the refrigerant flow.

The indoor unit chamber 410 includes partition plates 406 and 407 to divide the space inside the indoor unit chamber 410 into three sub-chambers. One partition plate 406 is opposed to the other partition plate 407 in the widthwise direction.

The indoor unit chamber 410 thus includes a first supply air guiding sub-chamber 412, a return air sub-chamber 411, and a second supply air guiding sub-chamber 413 arranged in the widthwise direction. The return air sub-chamber 411 resides between the first supply air guiding sub-chamber 412 and the second supply air guiding sub-chamber 413.

The first supply air guiding sub-chamber 412 and the return air sub-chamber 411 share one partition plate 406. The first supply air guiding sub-chamber 412 communicates with the return air sub-chamber 411 via a communication hole 406a provided in the partition plate 406.

The return air sub-chamber 411 and the second supply air guiding sub-chamber 413 share the other partition plate 407. The second supply air guiding sub-chamber 413 communicates with the return air sub-chamber 411 via a communication hole 407a provided in the partition plate 407.

The return air sub-chamber 411 accommodates the indoor fan 210. The first supply air guiding sub-chamber 412 accommodates the first indoor heat exchanger 110a. The second supply air guiding sub-chamber 413 accommodates the second indoor heat exchanger 110b.

The first indoor heat exchanger 110a is located on one side of the indoor fan 210 in the widthwise direction, whereas the second indoor heat exchanger 110b is located on the other side. The first indoor heat exchanger 110a is opposed to the indoor fan 210 on both sides of the communication hole 406a in the widthwise direction. The second indoor heat exchanger 110b is opposed to the indoor fan 210 on both sides of the communication hole 407a in the widthwise direction.

The return air sub-chamber 411 has a return opening 400a continuous to the interior compartment 910 illustrated in FIG. 1. The return opening 400a resides in the one of the lateral plates 403 of the indoor unit chamber 410 that is opposite to the compressor chamber 420 in the lengthwise direction. The return opening 400a is aligned to a return duct, which is not illustrated, communicating with the interior compartment 910 illustrated in FIG. 1.

The return opening 400a is provided with a return damper 510. The return damper 510 is switchable between an opening state for opening the return opening 400a and a closing state for closing the return opening 400a. The return damper 510 is controlled by the control device 300 illustrated in FIG. 2. The control device 300 is not illustrated in FIG. 3A or 3B.

The return air sub-chamber 411 has a fresh air inlet 400d continuous to the exterior EX via the compressor chamber 420. The fresh air inlet 400d resides at a position in the partition plate 404 opposed to the indoor fan 210 in the lengthwise direction. The fresh air inlet 400d is opposed to the return opening 400a on both sides of the indoor fan 210.

The fresh air inlet 400d is provided with a fresh air damper 530. The fresh air damper 530 is switchable between an opening state for opening the fresh air inlet 400d and a closing state for closing the fresh air inlet 400d. The fresh air damper 530 is controlled by the control device 300 illustrated in FIG. 2.

The first supply air guiding sub-chamber 412 has a supply opening 400b continuous to the interior compartment 910 illustrated in FIG. 1. Also, the second supply air guiding sub-chamber 413 has a supply opening 400c continuous to the interior compartment 910 illustrated in FIG. 1. The supply openings 400b and 400c reside in the one of the lateral plates 403 of the indoor unit chamber 410 that is opposite to the compressor chamber 420 in the lengthwise direction, like the return opening 400a.

This lateral plate 403 has the supply opening 400b on one side of the return opening 400a in the widthwise direction and has the supply opening 400c on the other side. The supply openings 400b and 400c are aligned to supply ducts, which are not illustrated, communicating with the interior compartment 910 illustrated in FIG. 1.

One supply opening 400b is provided with a supply damper 521. The supply damper 521 is switchable between an opening state for opening the supply opening 400b and a closing state for closing the supply opening 400b. The supply damper 521 is controlled by the control device 300 illustrated in FIG. 2.

Also, the other supply opening 400c is provided with a supply damper 522. The supply damper 522 is switchable between an opening state for opening the supply opening 400c and a closing state for closing the supply opening 400c. The supply damper 522 is controlled by the control device 300 illustrated in FIG. 2.

While the return damper 510, the supply damper 521, and the supply damper 522 are all in the opening states, the indoor fan 210 draws the internal air, which is the air in the interior compartment 910 illustrated in FIG. 1, through the return opening 400a, and then delivers the drawn internal air toward each of the pair of supply openings 400b and 400c.

The internal air delivered toward the one supply opening 400b passes through the communication hole 406a and the first indoor heat exchanger 110a, and then flows into the interior compartment 910 illustrated in FIG. 1 through the one supply opening 400*b*. Also, the internal air delivered toward the other supply opening 400*c* passes through the communication hole 407*a* and the second indoor heat exchanger 110*b*, and then flows into the interior compartment 910 illustrated in FIG. 1 through the other supply opening 400*b*.

The return air sub-chamber 411 guides the internal air to be drawn by the indoor fan 210 from the return opening 400*a* to the indoor fan 210. The first supply air guiding sub-chamber 412 guides the internal air delivered by the indoor fan 210 to the supply opening 400*b*. The second supply air guiding sub-chamber 413 guides the internal air delivered by the indoor fan 210 to the supply opening 400*c*.

The indoor fan 210 thus forms flows of the internal air from the return opening 400*a* toward the pair of supply openings 400*b* and 400*c* in the indoor unit chamber 410.

While the fresh air damper 530 is in the opening state, the indoor fan 210 draws the fresh air, which is the air in the exterior EX, into the return air sub-chamber 411 through the fresh air inlet 400*d*. The drawn fresh air joins the above-mentioned flows of the internal air, passes through the first indoor heat exchanger 110*a* and the second indoor heat exchanger 110*b*, and then flows into the interior compartment 910 illustrated in FIG. 1 through the supply openings 400*b* and 400*c*.

The refrigerant leakage detectors 600 described above are respectively provided in the first supply air guiding sub-chamber 412 and the second supply air guiding sub-chamber 413. One refrigerant leakage detector 600 is disposed at a position in the first supply air guiding sub-chamber 412 that receives the internal air that has passed through the first indoor heat exchanger 110*a*. The other refrigerant leakage detector 600 is disposed at a position in the second supply air guiding sub-chamber 413 that receives the internal air that has passed through the second indoor heat exchanger 110*b*.

Specifically, the refrigerant leakage detectors 600 each detect a concentration of the gas refrigerant in the internal air.

Figure 3B:
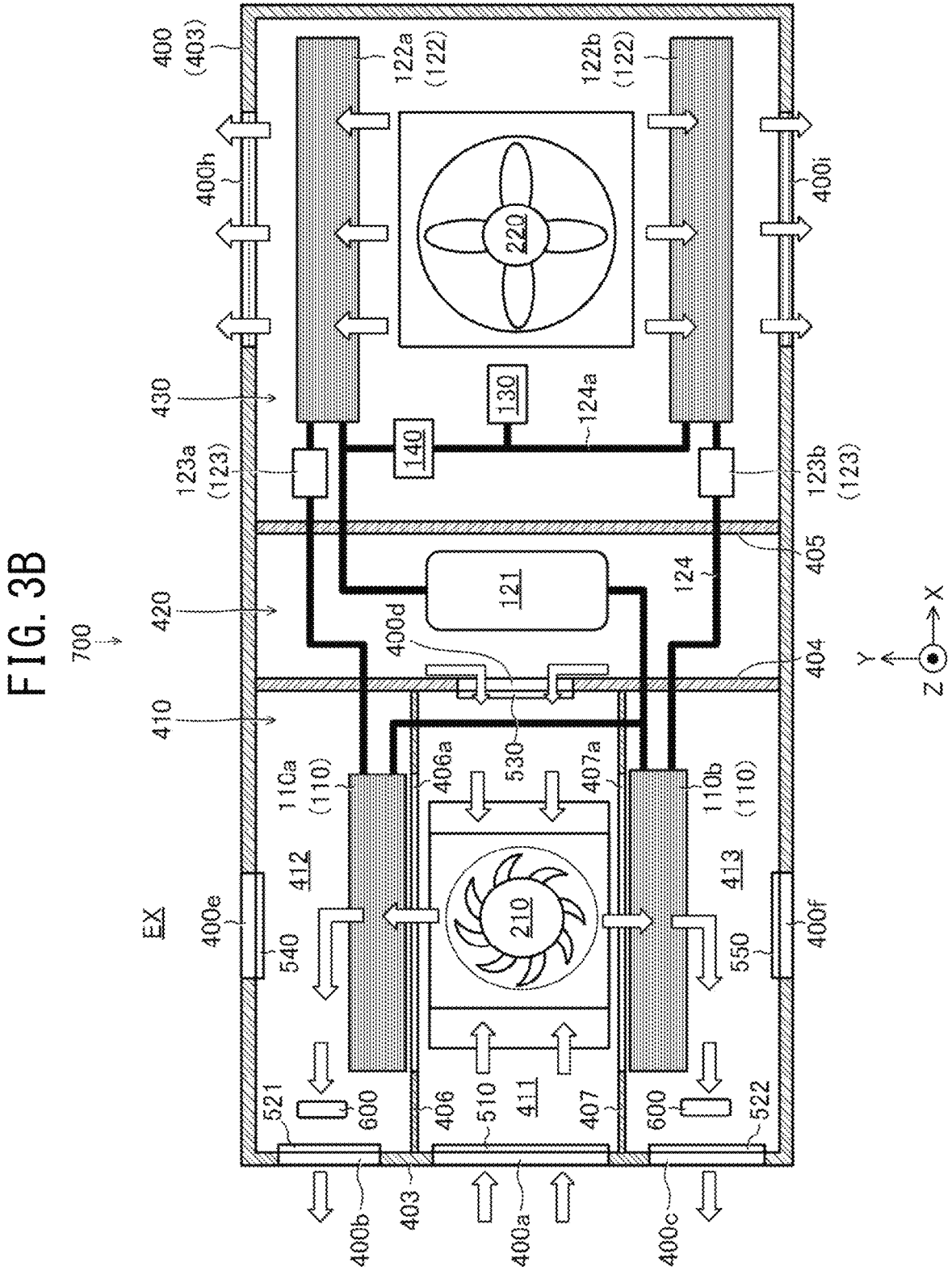
FIG. 3B is a plan view illustrating an internal structure of the vehicle air-conditioning apparatus according to Embodiment 1.

In an exemplary case where the refrigerant is leaked from the segment of the refrigerant circuit 100 illustrated in FIG. 2 located in the first supply air guiding sub-chamber 412 illustrated in FIG. 3B, specifically, the first indoor heat exchanger 110*a* and the refrigerant pipe 124, the leakage increases the concentration of the refrigerant in the first supply air guiding sub-chamber 412. The leakage of the refrigerant can thus be detected by the refrigerant leakage detector 600 in the first supply air guiding sub-chamber 412.

The refrigerant leakage detector 600 in the first supply air guiding sub-chamber 412 is disposed at a position that receives the internal air that has passed through the first indoor heat exchanger 110*a*. The refrigerant leakage detector 600 can thus rapidly detect leakage of the refrigerant in the first supply air guiding sub-chamber 412.

In another exemplary case where the refrigerant is leaked from the segment of the refrigerant circuit 100 illustrated in FIG. 2 located in the second supply air guiding sub-chamber 413 illustrated in FIG. 3B, specifically, the second indoor heat exchanger 110*b* and the refrigerant pipe 124, the leakage increases the concentration of the refrigerant in the second supply air guiding sub-chamber 413. The leakage of the refrigerant can thus be detected by the refrigerant leakage detector 600 in the second supply air guiding sub-chamber 413.

The refrigerant leakage detector 600 in the second supply air guiding sub-chamber 413 is disposed at a position that receives the internal air that has passed through the second indoor heat exchanger 110*b*. The refrigerant leakage detector 600 can thus rapidly detect leakage of the refrigerant in the second supply air guiding sub-chamber 413.

The first supply air guiding sub-chamber 412 also has an emergency vent 400*e* for discharging the leaked refrigerant to the exterior EX. This emergency vent 400*e* is continuous to the exterior EX. The emergency vent 400*e* is provided with an emergency damper 540. The emergency damper 540 is switchable between an opening state for opening the emergency vent 400*e* and a closing state for closing the emergency vent 400*e*.

The second supply air guiding sub-chamber 413 also has an emergency vent 400*f* for discharging the leaked refrigerant to the exterior EX. The emergency vent 400*f* is continuous to the exterior EX. The emergency vent 400*f* is provided with an emergency damper 550. The emergency damper 550 is switchable between an opening state for opening the emergency vent 400*f* and a closing state for closing the emergency vent 400*f*.

If the refrigerant is leaked in the presence of the above-mentioned flows of the internal air formed by the indoor fan 210 in the indoor unit chamber 410, the emergency dampers 540 and 550 are switched from the closing states to the opening states by the control device 300 illustrated in FIG. 2. The leaked refrigerant is thus discharged to the exterior EX.

The indoor fan 210 forms flows of the internal air with the air pressures in the first supply air guiding sub-chamber 412 and the second supply air guiding sub-chamber 413 being higher than the atmospheric pressure, which is the air pressure in the exterior EX. The air pressures are made higher, in order to rapidly discharge the leaked refrigerant to the exterior after the switching of the emergency dampers 540 and 550 to the opening states in response to leakage of the refrigerant.

The indoor fan 210 according to the embodiment is thus made of a sirocco fan suitable for increasing the air pressures in the first supply air guiding sub-chamber 412 and the second supply air guiding sub-chamber 413.

The description then focuses on the structure of the compressor chamber 420. The compressor chamber 420 communicates with the exterior EX. The compressor chamber 420 accommodates the compressor 121. The compressor 121 includes a compressing mechanism therein to compress the refrigerant by means of rotations about the rotational axis. The compressor 121 is oriented on its side such that the rotational axis extends horizontally.

The description then focuses on the structure of the outdoor unit chamber 430. The outdoor unit chamber 430 accommodates the outdoor heat exchanger 122, the expander 123, the refrigerant release valve 130, the refrigerant pressure detector 140, and the outdoor fan 220 described above.

The outdoor heat exchanger 122 includes a first outdoor heat exchanger 122*a* and a second outdoor heat exchanger 122*b* connected in parallel relative to the refrigerant flow. The first outdoor heat exchanger 122*a* is opposed to the second outdoor heat exchanger 122*b* on both sides of the outdoor fan 220 in the widthwise direction. The expander 123 includes a first expander 123*a* to expand the refrigerant condensed by the first outdoor heat exchanger 122*a*, and a second expander 123*b* to expand the refrigerant condensed by the second outdoor heat exchanger 122*b*.

As illustrated in FIG. 3A, the outdoor fan 220, which is an axial fan, is opposed to the top plate 402 in the height direction. The top plate 402 has a first air vent 400*g* continuous to the exterior EX at a position opposed to the outdoor fan 220.

Referring back to FIG. 3B, one of the lateral plates 403 has a second air vent 400*h* continuous to the exterior EX at a position opposed to the first outdoor heat exchanger 122*a*. Also, another of the lateral plates 403 has a second air vent 400*i* continuous to the exterior EX at a position opposed to the second outdoor heat exchanger 122*b*.

The outdoor fan 220 draws the external air through the first air vent 400*g* and either of the second air vents 400*h* and 400*i* described above, causes the drawn external air to pass through the first outdoor heat exchanger 122*a* and the second outdoor heat exchanger 122*b*, and then discharges the external air to the exterior EX through the other air vent. Specifically, the outdoor fan 220 forms flows of the external air from the first air vent 400*g* toward the second air vents 400*h* and 400*i* in the outdoor unit chamber 430.

The flows of the external air are received at the position of the refrigerant release valve 130 described above. Specifically, the refrigerant release valve 130 is located between the first outdoor heat exchanger 122*a* and the second outdoor heat exchanger 122*b* opposed to each other, on one side of the outdoor fan 220.

The refrigerant release valve 130 is provided to a high-pressure-part parallel-connecting segment 124*a* of the refrigerant pipe 124 for connecting the first outdoor heat exchanger 122*a* and the second outdoor heat exchanger 122*b* in parallel. The high-pressure-part parallel-connecting segment 124*a* is also provided with the refrigerant pressure detector 140 described above. The vehicle air-conditioning apparatus 700 has the detailed structure described above.

The following describes a process of monitoring refrigerant leakage executed by the control device 300, with reference to FIG. 4. The description refers to FIGS. 1 to 3B as required.

The process of monitoring refrigerant leakage is executed during the air conditioning in the interior compartment 910. The description assumes that the interior compartment 910 is under air conditioning. Specifically, the return damper 510 and the supply dampers 521 and 522 are all in the opening states, and the refrigerant release valve 130 is in the closed state. The compressor 121, the indoor fan 210, and the outdoor fan 220 are operating. The fresh air damper 530 may be in the opening state as required. The emergency dampers 540 and 550 are both in the closing states.

In these conditions during the air conditioning in the interior compartment 910, the indoor fan 210 maintains the air pressures in the first supply air guiding sub-chamber 412 and the second supply air guiding sub-chamber 413 to be higher than the atmospheric pressure, as described above.

As illustrated in FIG. 4, the control device 300 first determines whether the refrigerant is leaked from the refrigerant circuit 100, on the basis of results of detection by the refrigerant leakage detectors 600 (Step S10). When the control device 300 determines that the refrigerant is not leaked from the refrigerant circuit 100 (Step S10; NO), the process returns to Step S10. The existence of leakage of the refrigerant is thus monitored all the time.

When determining that the refrigerant is leaked from the refrigerant circuit 100 (Step S10; YES), the control device 300 executes a refrigerant discharging control for discharging the refrigerant to the exterior EX (Step S20).

The control device 300 determines that the refrigerant is leaked from the refrigerant circuit 100, when the leakage of the refrigerant is indicated by a result of detection by at least either of the refrigerant leakage detector 600 in the first supply air guiding sub-chamber 412 and the refrigerant leakage detector 600 in the second supply air guiding sub-chamber 413.

The following specifically describes the refrigerant discharging control. The control device 300 first stops the compressor 121, and switches the return damper 510 and the supply dampers 521 and 522 from the opening states to the closing states (Step S21). The control device 300 in this step keeps the indoor fan 210 and the outdoor fan 220 operating.

The stop of the compressor 121 inhibits the circulation of the refrigerant in the refrigerant circuit 100. This step can suppress further leakage of the refrigerant. The return damper 510 and the supply dampers 521 and 522 switched to the closing states disconnect the communication between the interior compartment 910 and the indoor unit chamber 410. The disconnection thus prevents the leaked refrigerant in the indoor unit chamber 410 from entering the interior compartment 910.

The control device 300 then determines whether the fresh air damper 530 is in the opening state (Step S22). When determining that the fresh air damper 530 is in the closing state (Step S22; NO), the control device 300 switches the fresh air damper 530 from the closing state to the opening state (Step S23).

The control device 300 then switches the emergency dampers 540 and 550 from the closing states to the opening states, while keeping the indoor fan 210 operating (Step S24). When the control device 300 determines that the fresh air damper 530 is in the opening state in Step S22 (Step S22; YES), the process also goes to Step S24.

Since the indoor fan 210 is kept operating at the switching of the emergency dampers 540 and 550 to the opening states, the air pressures in the first supply air guiding sub-chamber 412 and the second supply air guiding sub-chamber 413 are higher than the atmospheric pressure. The leaked refrigerant in the indoor unit chamber 410 is thus rapidly discharged to the exterior EX through the emergency dampers 540 and 550 in the opening states, simultaneously with the switching of the emergency dampers 540 and 550 to the opening states.

The switching of the emergency dampers 540 and 550 to the opening states also achieves formation of flows of the fresh air from the fresh air inlet 400*d* toward the emergency vents 400*e* and 400*f* in the indoor unit chamber 410.

The indoor fan 210 thus draws the fresh air in the exterior EX to the return air sub-chamber 411 through the fresh air inlet 400*d*, and delivers the drawn fresh air toward each of the first supply air guiding sub-chamber 412 and the second supply air guiding sub-chamber 413.

The fresh air delivered toward the first supply air guiding sub-chamber 412 passes through the communication hole 406*a* and the first indoor heat exchanger 110*a*, and is then discharged to the exterior EX through the emergency vent 400*e*. Also, the fresh air delivered toward the second supply air guiding sub-chamber 413 passes through the communication hole 407*a* and the second indoor heat exchanger 110*b*, and is then discharged to the exterior EX through the emergency damper 550.

The indoor fan 210 thus forms flows of the fresh air from the fresh air inlet 400*d* toward the emergency vents 400*e* and 400*f* in the indoor unit chamber 410. In this step, the air pressures in the first supply air guiding sub-chamber 412 and the second supply air guiding sub-chamber 413 are still higher than the atmospheric pressure.

The refrigerant leaked from the refrigerant circuit 100 in the indoor unit chamber 410 is discharged to the exterior EX with these flows of the fresh air. The leaked refrigerant is thus prevented from remaining in the indoor unit chamber 410.

The control device 300 then switches the refrigerant release valve 130 in the outdoor unit chamber 430 from the closed state to the open state while keeping the outdoor fan 220 operating, and thus starts active release of the refrigerant from the refrigerant circuit 100 (Step S25).

The refrigerant release valve 130 in the outdoor unit chamber 430 is disposed at the position in the path of a flow of the external air formed by the outdoor fan 220, as described above. The refrigerant released through the refrigerant release valve 130 in the open state is thus discharged to the exterior EX with the flow of the external air.

The refrigerant release valve 130 is provided to the high pressure part 100a having a relatively high pressure of the refrigerant in the refrigerant circuit 100. The refrigerant enclosed in the refrigerant circuit 100 can thus be rapidly discharged to the exterior EX through the refrigerant release valve 130.

The release of the refrigerant performed in the outdoor unit chamber 430 apart from the interior compartment 910 significantly reduces the probability of entrance of the released refrigerant into the interior compartment 910. This active release of the refrigerant from the refrigerant circuit 100 in the outdoor unit chamber 430 can immediately stop the leakage of the refrigerant from the refrigerant circuit 100 in the indoor unit chamber 410.

The control device 300 then determines whether the active release of the refrigerant from the refrigerant circuit 100 is completed, on the basis of a result of detection by the refrigerant pressure detector 140 (Step S26). Specifically, the control device 300 executes the determination in Step S26 using a threshold indicating a sufficiently low pressure that implies proper removal of the refrigerant from the refrigerant circuit 100. Specifically, this threshold is a value indicating the atmospheric pressure.

A result of detection by the refrigerant pressure detector 140 higher than the threshold implies that the refrigerant remains in the refrigerant circuit 100. On the basis of such a result, the control device 300 determines that the active release of the refrigerant from the refrigerant circuit 100 is not completed (Step S26; NO), and the process returns to Step S26. The completion of the active release of the refrigerant from the refrigerant circuit 100 is thus monitored in real time.

In contrast, a result of detection by the refrigerant pressure detector 140 equal to or lower than the threshold implies that the refrigerant has been properly removed from the refrigerant circuit 100. On the basis of such a result, the control device 300 determines that the active release of the refrigerant from the refrigerant circuit 100 is completed (Step S26; YES). The pressure in the high pressure part 100a equal to or lower than the atmospheric pressure also implies proper removal of the refrigerant from the refrigerant circuit 100, because the low pressure part 100b in communication with the high pressure part 100a also has a pressure equal to or lower than the atmospheric pressure.

When determining that the active release of the refrigerant from the refrigerant circuit 100 is completed (Step S26; YES), the control device 300 switches the refrigerant release valve 130 from the open state back to the closed state. This step avoids unnecessarily opening of the release of the refrigerant release valve 130 after completion of the release of the refrigerant.

The proper removal of the refrigerant from the refrigerant circuit 100 is deemed as the stop of leakage of the refrigerant from the refrigerant circuit 100 in the indoor unit chamber

410. When the control device 300 determines that the active release of the refrigerant from the refrigerant circuit 100 is completed (Step S26; YES), the control device 300 switches the emergency dampers 540 and 550 from the opening states to the closing states (Step S27). This step prevents rainwater and dust from entering the indoor unit chamber 410 through the emergency vents 400e and 400f.

The control device 300 in this embodiment also switches the fresh air damper 530 from the opening state to the closing state, and stops the indoor fan 210 and the outdoor fan 220 (Step S30). In the embodiment, the return damper 510 and the supply dampers 521 and 522 remain in the closing states. The refrigerant circuit 100 is then sent for repair. The process of monitoring refrigerant leakage is thus terminated.

The above-described embodiment brings about the following effects.

(1) The first supply air guiding sub-chamber 412 accommodates the first indoor heat exchanger 110a, and the second supply air guiding sub-chamber 413 accommodates the second indoor heat exchanger 110b. That is, the leakage if leaked from the segment of the refrigerant circuit 100 including the first indoor heat exchanger 110a or the second indoor heat exchanger 110b may exist in the first supply air guiding sub-chamber 412 or the second supply air guiding sub-chamber 413. The air pressures in the first supply air guiding sub-chamber 412 and the second supply air guiding sub-chamber 413 are maintained to be higher than the atmospheric pressure, at the switching of the emergency dampers 540 and 550 to the opening states.

In response to the switching of the emergency dampers 540 and 550 to the opening states, the leaked refrigerant in the first supply air guiding sub-chamber 412 or the second supply air guiding sub-chamber 413 is rapidly discharged to the exterior EX through the emergency vent 400e or 400f.

(2) Some configurations for discharging the leaked refrigerant to the exterior EX have been known, like the apparatus disclosed in Patent Literature 1. In the existing configurations, however, the opening (hereinafter referred to simply as "opening") corresponding to the emergency vent 400e or 400f for discharging the leaked refrigerant to the exterior EX is disposed in a place under a negative pressure lower than the atmospheric pressure. Such an existing structure is developed mainly because the indoor fan 210 is provided in the portion corresponding to the supply openings 400b and 400c. This opening under a negative pressure may allow rainwater, dust, and other objects in the exterior EX to enter the indoor unit chamber 410 through the opening, even when the opening is closed by a damper.

In contrast, the emergency vents 400e and 400f in the embodiment are respectively located in the first supply air guiding sub-chamber 412 and the second supply air guiding sub-chamber 413. In addition, the air pressures in the first supply air guiding sub-chamber 412 and the second supply air guiding sub-chamber 413 are maintained to be positive pressures higher than the atmospheric pressure, during the operation of the indoor fan 210. This structure can make it harder for rainwater, dust, and other objects in the exterior EX to enter the indoor unit chamber 410, despite of the emergency vents 400e and 400f in the indoor unit chamber 410.

(3) The indoor fan 210 in the embodiment performs both the function of forming a flow of the internal air in the indoor unit chamber 410 for the purpose of air conditioning in the interior compartment 910 and the function of discharging the leaked refrigerant in the indoor unit chamber 410 to the exterior EX. The vehicle air-conditioning apparatus 700 thus has a simpler structure than that of an apparatus including another facility for discharging the leaked refrigerant to the exterior EX in addition to the indoor fan 210.

(4) The outdoor fan 220 in the embodiment performs both the function of facilitating heat exchange at the outdoor heat exchanger 122 and the function of discharging the refrigerant, released through the refrigerant release valve 130, to the exterior EX. The vehicle air-conditioning apparatus 700 thus has a simpler structure than that of an apparatus including another facility for discharging the refrigerant, released through the refrigerant release valve 130, to the exterior EX in addition to the outdoor fan 220.

Embodiment 2

Although the indoor fan 210 is stopped after the refrigerant discharging control in Embodiment 1, the indoor fan 210 may continue the operation after the refrigerant discharging control. The following describes a specific example of this modification.

Figure 5:
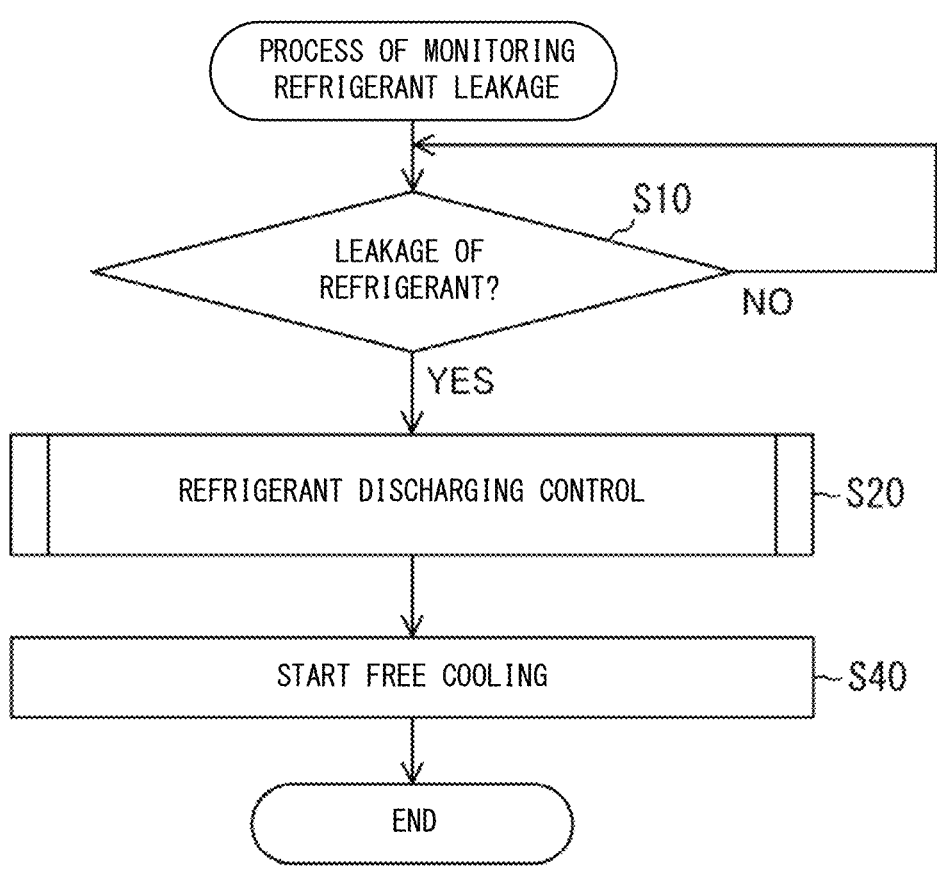
FIG. 5 is a flowchart illustrating a process of monitoring refrigerant leakage according to Embodiment 2.

As illustrated in FIG. 5, the control device 300 in this embodiment, after the above-described refrigerant discharging control (Step S20), starts free cooling of the interior compartment 910 (Step S40). The other configurations and operations are identical to those in Embodiment 1.

Specifically, the control device 300 switches the return damper 510 and the supply dampers 521 and 522 from the closing states to the opening states, while keeping the indoor fan 210 operating and maintaining the fresh air damper 530 in the opening state, in Step S40.

The fresh air damper 530 in the opening state can thus allow the fresh air entering the indoor unit chamber 410 to be supplied into the interior compartment 910.

This fresh air supply can ensure sufficient comfort in the interior compartment 910, despite of the absence of a refrigeration cycle in the refrigerant circuit 100. The outdoor fan 220 is stopped in Step S40.

The free cooling is started immediately after the determination that the release of the refrigerant is completed in Step S26 in FIG. 4 (Step S26; YES) and the switching in Step S27 in FIG. 4. As described above, Step S25 in FIG. 4 involves active release of the refrigerant, and Step S26 in FIG. 4 involves real-time determination of whether the release of the refrigerant is completed. This configuration can make the period as short as possible from the stop of the air conditioning in the interior compartment 910 in Step S21 in FIG. 4 until the start of the free cooling in Step S40 in FIG. 5. This reduced period also contributes to maintenance of sufficient comfort in the interior compartment 910.

Embodiment 3

Although the vehicle air-conditioning apparatus 700 in Embodiment 1 has a function of cooling the interior compartment 910 by means of the refrigerant circuit 100, the vehicle air-conditioning apparatus 700 may have a function of heating the interior compartment 910. The following describes a specific example of this modification.

Figure 6:
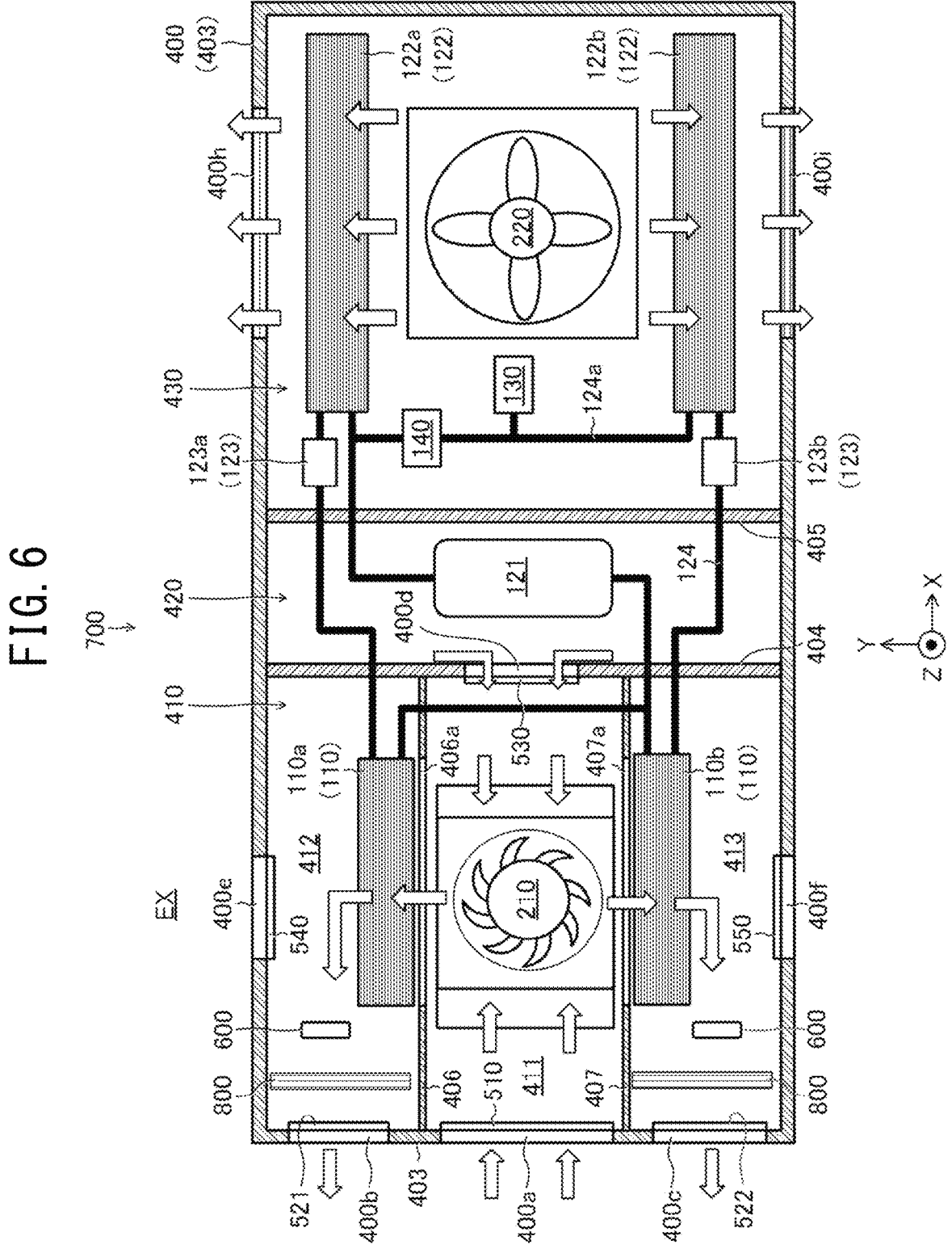
FIG. 6 is a plan view illustrating an internal structure of a vehicle air-conditioning apparatus according to Embodiment 3.

As illustrated in FIG. 6, the vehicle air-conditioning apparatus 700 according to the embodiment further includes electric heaters 800 to heat the air by Joule heat. The electric heaters 800 are respectively disposed at a position receiving the internal air that has passed through the first indoor heat exchanger 110a in the first supply air guiding sub-chamber 412, and a position receiving the internal air that has passed through the second indoor heat exchanger 110b in the second supply air guiding sub-chamber 413.

In the refrigerant circuit 100 in this embodiment, the indoor heat exchanger 110 serves as a condenser, and the outdoor heat exchanger 122 serves as an evaporator.

The refrigerant circuit 100 may include a four-way valve, which is not illustrated. This four-way valve may be capable of switching between a mode in which the indoor heat exchanger 110 serves as a condenser and the outdoor heat exchanger 122 serves as an evaporator, and a mode in which the indoor heat exchanger 110 serves as an evaporator and the outdoor heat exchanger 122 serves as a condenser.

Figure 7:
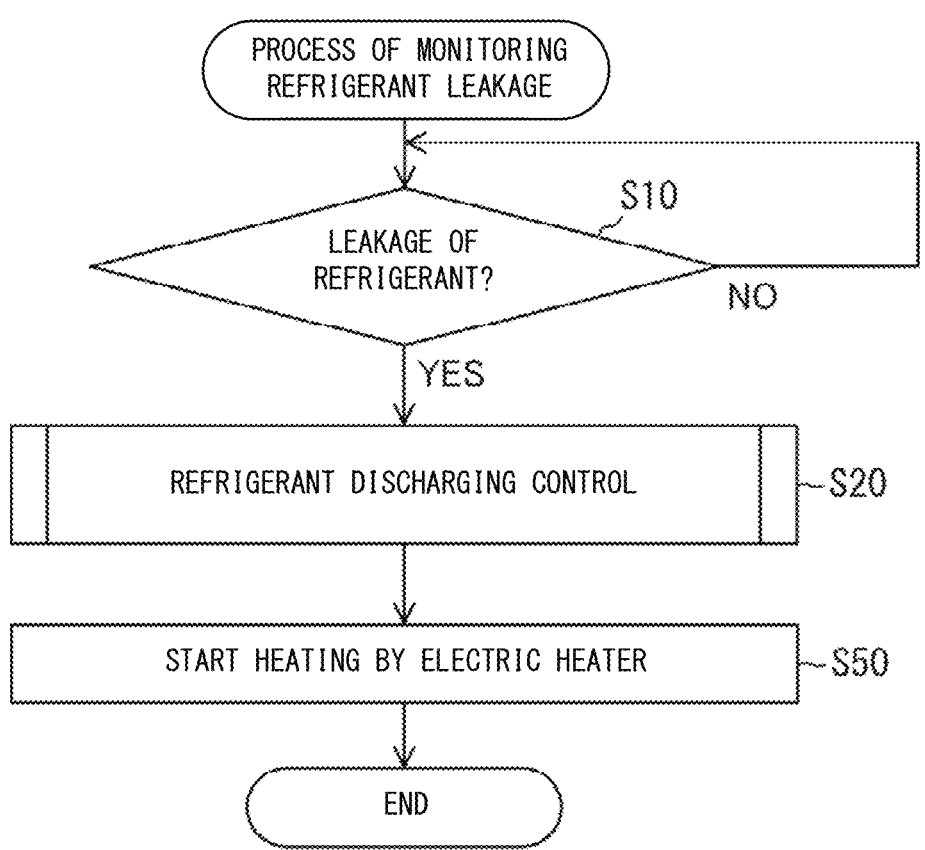
FIG. 7 is a flowchart illustrating a process of monitoring refrigerant leakage according to Embodiment 3.

FIG. 7 illustrates a process of monitoring refrigerant leakage according to the embodiment. The process of monitoring refrigerant leakage in the embodiment is executed during the heating of the interior compartment 910 by means of the refrigerant circuit 100.

The control device 300 in this embodiment, after the above-described refrigerant discharging control (Step S20), starts to cause the electric heaters 800 to heat the interior compartment 910 (Step S50). The other configurations and operations are identical to those in Embodiment 1.

Specifically, the control device 300 energizes the electric heaters 800, switches the return damper 510 and the supply dampers 521 and 522 from the closing states to the opening states, and switches the fresh air damper 530 from the opening state to the closing state, while keeping the indoor fan 210 operating, in Step S50.

The electric heaters 800 thus heat the internal air in the interior compartment 910. This heating can ensure sufficient comfort in the interior compartment 910, despite of the absence of a heat pump in the refrigerant circuit 100. The outdoor fan 220 is stopped in Step S50.

The heating by the electric heaters 800 is started immediately after the determination that the release of the refrigerant is completed in Step S26 in FIG. 4 (Step S26; YES) and the switching in Step S27 in FIG. 4. As described above, Step S25 in FIG. 4 involves active release of the refrigerant, and Step S26 in FIG. 4 involves real-time determination of whether the release of the refrigerant is completed. This configuration can make the period as short as possible from the stop of the air conditioning in the interior compartment 910 in Step S21 in FIG. 4 until the start of the heating in Step S50 in FIG. 7. This reduced period also contributes to maintenance of sufficient comfort in the interior compartment 910.

Embodiments 1 to 3 described above may be modified into configurations described below.

Although the combustible refrigerant is used in Embodiment 1, the refrigerant is not necessarily combustible. Specifically, the refrigerant may contain at least 90 mass % of carbon dioxide. Regardless of no combustibility of the refrigerant, the leaked refrigerant if entering the interior compartment 910 lowers the oxygen concentration in the interior compartment 910. This problem can be effectively solved by the refrigerant discharging control executed by the vehicle air-conditioning apparatus 700.

Embodiments 1 to 3 described above may be combined with each other. In the case of combination of Embodiments 2 and 3, the control device 300, after the refrigerant discharging control, may execute free cooling in the interior compartment 910 at a temperature higher than a reference temperature indicating sufficient comfort, and execute heating by the electric heaters 800 in the interior compartment 910 at a temperature of lower than the reference temperature. The refrigerant circuit 100 according to Embodiment 3 may be dedicated to the cooling of the interior compartment 910, like the refrigerant circuit 100 according to Embodiment 1.

Although FIG. 2 illustrates the refrigerant pressure detector 140 provided in the high pressure part 100*a* of the refrigerant circuit 100, the refrigerant pressure detector 140 may be provided in the low pressure part 100*b* of the refrigerant circuit 100, or in both of the high pressure part 100*a* and the low pressure part 100*b*.

The refrigerant circuit 100 may include a valve switchable between a closed state for disconnecting the communication between the high pressure part 100*a* and the low pressure part 100*b*, and an open state for making the high pressure part 100*a* and the low pressure part 100*b* in communication with each other. In this case, this valve is preferably maintained in the open state by the control device 300 in Step S21 in FIG. 4. In the case where the high pressure part 100*a* and the low pressure part 100*b* are both provided with refrigerant pressure detectors 140, this valve may be switched to the closed state in Step S21 in FIG. 4. When the value detected at the refrigerant pressure detector 140 in the high pressure part 100*a* and the value detected at the refrigerant pressure detector 140 in the low pressure part 100*b* are both the above-mentioned threshold or lower, the release of the refrigerant from the refrigerant circuit 100 is determined to be completed in Step S26 in FIG. 4.

Although FIG. 4 illustrates the steps involving the switching of the fresh air damper 530 to the opening state in Step S23 followed by the switching of the emergency dampers 540 and 550 to the opening states in Step S24, the switching of the fresh air damper 530 to the opening state may follow the switching of the emergency dampers 540 and 550 to the opening states.

Although FIG. 3B illustrates the refrigerant leakage detectors 600 provided in the indoor unit chamber 410, the refrigerant leakage detectors 600 may be disposed at other positions. The refrigerant leakage detectors 600 may be provided in the compressor chamber 420, or in the outdoor unit chamber 430, or in both of the indoor unit chamber 410 and the outdoor unit chamber 430, or in all of the indoor unit chamber 410, the compressor chamber 420, and the outdoor unit chamber 430. The return damper 510 and the supply dampers 521 and 522 may be maintained in the opening states in Step S21 in FIG. 4, so as to prevent the refrigerant entering the interior compartment 910 from remaining in the sealed interior compartment 910.

Although FIG. 1 illustrates the vehicle air-conditioning apparatus 700 installed on the roof of the railway vehicle 900, the vehicle air-conditioning apparatus 700 may be disposed at another position in the railway vehicle 900. The vehicle air-conditioning apparatus 700 may be installed under the floor of the railway vehicle 900. The concept of "railway vehicles" in this specification encompasses not only trains but also bullet trains, monorails, and other vehicles traveling along rails. The vehicles to be provided with the vehicle air-conditioning apparatus 700 are not necessarily railway vehicles and may be buses and other automobiles.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

100 Refrigerant circuit
100*a* High pressure part
100*b* Low pressure part
110 Indoor heat exchanger
110*a* First indoor heat exchanger
110*b* Second indoor heat exchanger
120 Group of cooperative devices
121 Compressor
122 Outdoor heat exchanger
122*a* First outdoor heat exchanger
122*b* Second outdoor heat exchanger
123 Expander
123*a* First expander
123*b* Second expander
124 Refrigerant pipe
124*a* High-pressure-part parallel-connecting segment
130 Refrigerant release valve
140 Refrigerant pressure detector
210 Indoor fan
220 Outdoor fan
300 Control device
400 Housing
400*a* Return opening
400*b*, 400*c* Supply opening
400*d* Fresh air inlet
400*e*, 400*f* Emergency vent
400*g* First air vent
400*h*, 400*i* Second air vent
401 Bottom plate
402 Top plate
403 Lateral plate
404, 405, 406, 407 Partition plate
406*a*, 407*a* Communication hole
410 Indoor unit chamber
411 Return air sub-chamber
412 First supply air guiding sub-chamber (supply air guiding sub-chamber)
413 Second supply air guiding sub-chamber (supply air guiding sub-chamber)
420 Compressor chamber
430 Outdoor unit chamber
510 Return damper
521, 522 Supply damper
530 Fresh air damper
540, 550 Emergency damper
600 Refrigerant leakage detector
700 Vehicle air-conditioning apparatus
800 Electric heater
900 Railway vehicle (vehicle)
910 Interior compartment
EX Exterior

The invention claimed is:

1. A vehicle air-conditioning apparatus comprising:
a housing installable in a vehicle, the housing including an indoor unit chamber having
a return opening and a supply opening each continuous to an interior compartment of the vehicle, and
an emergency vent continuous to an exterior of the vehicle;
an emergency damper provided to the emergency vent, the emergency damper being configured to be switchable between an opening state for opening the emergency vent and a closing state for closing the emergency vent;

an indoor fan disposed in the indoor unit chamber, the indoor fan being configured to draw internal air through the return opening, and deliver the drawn internal air toward the supply opening, and thus form a flow of the internal air from the return opening toward the supply opening in the indoor unit chamber, while the emergency damper is in the closing state, the internal air being air in the interior compartment;

a refrigerant circuit disposed at a position in the indoor unit chamber, the position being in a path of the flow of the internal air, the refrigerant circuit including an indoor heat exchanger to perform heat exchange between refrigerant and the internal air, and a group of cooperative devices to constitute a refrigeration cycle using the refrigerant with the indoor heat exchanger;

a refrigerant leakage detector to detect leakage of the refrigerant from the refrigerant circuit; and a control device to execute a refrigerant discharging control involving switching the emergency damper from the closing state to the opening state while keeping the indoor fan operating, when the control device determines, based on a result of detection by the refrigerant leakage detector, that the refrigerant is leaked from the refrigerant circuit, wherein the indoor unit chamber includes a supply air guiding sub-chamber to guide the internal air delivered by the indoor fan to the supply opening, the indoor heat exchanger is disposed in the supply air guiding sub-chamber, the emergency vent is included in the supply air guiding sub-chamber, and the indoor fan forms the flow of the internal air with an air pressure in the supply air guiding sub-chamber being higher than an atmospheric pressure that is an air pressure in the exterior of the vehicle.

2. The vehicle air-conditioning apparatus according to claim 1, wherein the indoor unit chamber further includes a return air sub-chamber to guide the internal air, drawn by the indoor fan, from the return opening to the indoor fan, the return air sub-chamber having a fresh air inlet continuous to the exterior of the vehicle, the vehicle air-conditioning apparatus further includes a fresh air damper provided to the fresh air inlet, the fresh air damper being configured to be switchable between an opening state for opening the fresh air inlet and a closing state for closing the fresh air inlet, and the control device switches the fresh air damper to the opening state in the refrigerant discharging control.

3. The vehicle air-conditioning apparatus according to claim 1, wherein the refrigerant circuit further includes a refrigerant release valve configured to be switchable between an open state for allowing the refrigerant to be released from the refrigerant circuit and a closed state for preventing the refrigerant from being released, and an outdoor heat exchanger to perform heat exchange between external air and the refrigerant, the external air being air in the exterior of the vehicle, the housing further includes an outdoor unit chamber that accommodates the refrigerant release valve and the outdoor heat exchanger, the vehicle air-conditioning apparatus further includes an outdoor fan disposed in the outdoor unit chamber, the outdoor fan being configured to form a flow of the external air passing through the outdoor heat exchanger in the outdoor unit chamber, the refrigerant release valve is disposed at a position in the outdoor unit chamber, the position being in a path of the flow of the external air, and when the control device determines that the refrigerant is leaked from the refrigerant circuit, the control device switches the refrigerant release valve from the closed state to the open state while keeping the outdoor fan operating.

4. The vehicle air-conditioning apparatus according to claim 3, further comprising:

a refrigerant pressure detector to detect a pressure of the refrigerant in the refrigerant circuit, wherein the control device switches the emergency damper from the opening state to the closing state, when the control device determines, based on a result of detection by the refrigerant pressure detector, that release of the refrigerant from the refrigerant circuit is completed.

5. The vehicle air-conditioning apparatus according to claim 1, further comprising:

a supply damper provided to the supply opening, the supply damper being configured to be switchable between an opening state for opening the supply opening and a closing state for closing the supply opening, wherein the control device switches the supply damper from the opening state to the closing state, when the control device determines that the refrigerant is leaked from the refrigerant circuit.

6. The vehicle air-conditioning apparatus according to claim 1, wherein the refrigerant leakage detector is disposed at a position in the supply air guiding sub-chamber, the refrigerant leakage detector being configured to detect a concentration of the refrigerant in the internal air, the position receiving the internal air that has passed through the indoor heat exchanger.

7. The vehicle air-conditioning apparatus according to claim 1, wherein the refrigerant is combustible.

8. The vehicle air-conditioning apparatus according to claim 2, wherein the refrigerant circuit further includes a refrigerant release valve configured to be switchable between an open state for allowing the refrigerant to be released from the refrigerant circuit and a closed state for preventing the refrigerant from being released, and an outdoor heat exchanger to perform heat exchange between external air and the refrigerant, the external air being air in the exterior of the vehicle, the housing further includes an outdoor unit chamber that accommodates the refrigerant release valve and the outdoor heat exchanger, the vehicle air-conditioning apparatus further includes an outdoor fan disposed in the outdoor unit chamber, the outdoor fan being configured to form a flow of the external air passing through the outdoor heat exchanger in the outdoor unit chamber, the refrigerant release valve is disposed at a position in the outdoor unit chamber, the position being in a path of the flow of the external air, and when the control device determines that the refrigerant is leaked from the refrigerant circuit, the control device switches the refrigerant release valve from the closed state to the open state while keeping the outdoor fan operating.

9. The vehicle air-conditioning apparatus according to claim 2, further comprising:

a supply damper provided to the supply opening, the supply damper being configured to be switchable between an opening state for opening the supply opening and a closing state for closing the supply opening, wherein the control device switches the supply damper from the opening state to the closing state, when the control device determines that the refrigerant is leaked from the refrigerant circuit.

10. The vehicle air-conditioning apparatus according to claim 3, further comprising:

a supply damper provided to the supply opening, the supply damper being configured to be switchable between an opening state for opening the supply opening and a closing state for closing the supply opening, wherein the control device switches the supply damper from the opening state to the closing state, when the control device determines that the refrigerant is leaked from the refrigerant circuit.

11. The vehicle air-conditioning apparatus according to claim 4, further comprising:

a supply damper provided to the supply opening, the supply damper being configured to be switchable between an opening state for opening the supply opening and a closing state for closing the supply opening, wherein the control device switches the supply damper from the opening state to the closing state, when the control device determines that the refrigerant is leaked from the refrigerant circuit.

12. The vehicle air-conditioning apparatus according to claim 2, wherein the refrigerant leakage detector is disposed at a position in the supply air guiding sub-chamber, the refrigerant leakage detector being configured to detect a concentration of the refrigerant in the internal air, the position receiving the internal air that has passed through the indoor heat exchanger.

13. The vehicle air-conditioning apparatus according to claim 3, wherein the refrigerant leakage detector is disposed at a position in the supply air guiding sub-chamber, the refrigerant leakage detector being configured to detect a concentration of the refrigerant in the internal air, the position receiving the internal air that has passed through the indoor heat exchanger.

14. The vehicle air-conditioning apparatus according to claim 4, wherein the refrigerant leakage detector is disposed at a position in the supply air guiding sub-chamber, the refrigerant leakage detector being configured to detect a concentration of the refrigerant in the internal air, the position receiving the internal air that has passed through the indoor heat exchanger.

15. The vehicle air-conditioning apparatus according to claim 5, wherein the refrigerant leakage detector is disposed at a position in the supply air guiding sub-chamber, the refrigerant leakage detector being configured to detect a concentration of the refrigerant in the internal air, the position receiving the internal air that has passed through the indoor heat exchanger.

16. The vehicle air-conditioning apparatus according to claim 2, wherein the refrigerant is combustible.

17. The vehicle air-conditioning apparatus according to claim 3, wherein the refrigerant is combustible.

18. The vehicle air-conditioning apparatus according to claim 4, wherein the refrigerant is combustible.

19. The vehicle air-conditioning apparatus according to claim 5, wherein the refrigerant is combustible.

20. The vehicle air-conditioning apparatus according to claim 6, wherein the refrigerant is combustible.

\* \* \* \* \*